United States Patent
McCracken et al.

(10) Patent No.: US 7,487,500 B1
(45) Date of Patent: Feb. 3, 2009

(54) SYSTEM AND METHOD FOR INSTALLING AND CONFIGURING SOFTWARE FOR A NETWORK ELEMENT IN AN OPTICAL COMMUNICATIONS NETWORK

(75) Inventors: David McCracken, Jordanstown (GB); Paul Crossey, Belfast (GB); Helen Cassidy, Castledawson (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 792 days.

(21) Appl. No.: 10/962,043

(22) Filed: Oct. 8, 2004

Related U.S. Application Data

(60) Provisional application No. 60/510,004, filed on Oct. 9, 2003.

(51) Int. Cl.
*G06F 9/44* (2006.01)
*G06F 9/00* (2006.01)
*G06F 15/177* (2006.01)

(52) U.S. Cl. .................. 717/177; 717/172; 713/100; 709/220; 709/221; 709/222; 719/310; 719/327; 719/331

(58) Field of Classification Search .............. 717/174, 717/177, 172
See application file for complete search history.

(56) References Cited

U.S. PATENT DOCUMENTS

| | | | | |
|---|---|---|---|---|
| 6,240,511 B1* | 5/2001 | Blumenau et al. | .............. | 713/1 |
| 6,446,203 B1* | 9/2002 | Aguilar et al. | .................. | 713/2 |
| 6,513,159 B1* | 1/2003 | Dodson | ..................... | 717/178 |
| 6,633,977 B1* | 10/2003 | Hamilton et al. | ............. | 713/100 |
| 6,880,086 B2* | 4/2005 | Kidder et al. | ................ | 713/191 |
| 6,938,250 B2* | 8/2005 | Cohen et al. | ................. | 717/178 |
| 6,970,957 B1* | 11/2005 | Oshins et al. | .................. | 710/60 |
| 2002/0099975 A1* | 7/2002 | Whiteside et al. | ............. | 714/15 |
| 2005/0021186 A1* | 1/2005 | Murray et al. | ............... | 700/245 |
| 2005/0034118 A1* | 2/2005 | Raman et al. | ................ | 717/174 |
| 2005/0044096 A1* | 2/2005 | Caliendo et al. | ............ | 707/102 |
| 2005/0144436 A1* | 6/2005 | Chen et al. | .................... | 713/100 |
| 2005/0198596 A1* | 9/2005 | Oshins et al. | ................... | 716/3 |
| 2005/0223388 A1* | 10/2005 | Gehman et al. | ............. | 719/321 |
| 2005/0229143 A1* | 10/2005 | Gehman et al. | ................ | 716/18 |

OTHER PUBLICATIONS

"An Introduction to the eCos World", 2002, retrieved from <www.informit.com/content/images/0130354732/samplechapter/0130354732>, p. 1-16.*

\* cited by examiner

*Primary Examiner*—Eric B Kiss
*Assistant Examiner*—Marina Lee
(74) *Attorney, Agent, or Firm*—Guerin & Rodriguez LLP; Michael A. Rodriguez

(57) ABSTRACT

The invention features a system and method for installing and configuring a common software load in optical network elements. In brief overview, a configurable hardware abstraction layer (HAL) is interposed between the application software and the drivers in the common software load. With the use of a configurable HAL, network elements embodying the invention can use the same common software load for each type of card. Hence, an installer updating or originally configuring the cards in a plurality of network elements can accommodate all of the cards with the transmission of one software load. Instead of centrally tracking and organizing card specific software loads, the common software load in combination with the HAL manages the installation and upgrading process on the local card level.

19 Claims, 3 Drawing Sheets

SYSTEM AND METHOD FOR INSTALLING AND CONFIGURING SOFTWARE FOR A NETWORK ELEMENT IN AN OPTICAL COMMUNICATIONS NETWORK

RELATED APPLICATION

This application claims the benefit of the filing date of U.S. Provisional Application Ser. No. 60/510,004, filed Oct. 9, 2003, titled "System and Method for Installing and Configuring Software for a Network Element in a Optical Communications Network," the entirety of such provisional application is incorporated by reference herein.

FIELD OF THE INVENTION

The invention relates generally to installing and configuring software in optical network elements. More particularly, the invention relates to installing software applications and device drivers on a plurality of cards of an optical network element.

BACKGROUND

Optical network elements generally include, but are not limited to, three types of circuit packs or cards: shelf processors (SP) cards, cross-connect (XC) cards, and port or tributary cards. Types of port cards include electrical port cards and optical port cards. Electrical port cards support traffic types such as Ethernet, DS1, DS3, ES1 and ES3. The types of optical port cards are further categorized by the data speed supported by that card. Examples of optical port card types include OC-12, OC-48, and OC-192 (generally, OC-n). Each card executes software that accomplishes the designed functionality of that card. This software generally includes application software that interacts with driver software to control specific hardware components of the card and, thus, to achieve the card's designed functionality. The application software and drivers of each card are stored in the card's local memory.

Typically, different software is installed on each different type of card. For example, OC-12 port cards require different application and driver software than OC-48 cards, and XC cards require different application and driver software than port cards. Accordingly, an installer typically installs different software on each different type card, transmitting the different software over the network to the network element for installation on the appropriate cards. Maintaining different software for different card types can be an onerous task, particularly when upgrading software and tracking software versions for the various cards. Thus, there remains a need for a system and method that simplifies the process of installing software on cards in network elements commonly used in optical communications networks.

SUMMARY

In one aspect, the invention features a method for installing and configuring software applications and device drivers in a network element in an optical network. A copy of a software load is installed onto each card of a plurality of cards in the network element. Each copy of the software load includes a plurality of software applications for different types of cards, a hardware abstraction layer, and a plurality of device drivers for controlling different types of hardware devices. The hardware abstraction layer of each card determines a type of that card and links one of the software applications of the software load to at least one of the device drivers based on the type of that card.

In another aspect, the invention features a card in a network element of an optical network. The card comprises at least one hardware device and memory storing a software load having a plurality of software applications for operating a plurality of different card types, a hardware abstraction layer, and a plurality of device drivers for controlling a plurality of different types of hardware devices. A processor runs the hardware abstraction layer to link one of the software applications of the software load to at least one of the device drivers for controlling the at least one hardware device.

In still another aspect, the invention features a network element comprising a plurality of cards of different types. Each card has at least one hardware device, a processor, and memory for storing a software load including a plurality of software applications for operating a plurality of different card types, a hardware abstraction layer, and a plurality of device drivers for controlling a plurality of different types of hardware devices. Each card of the plurality of cards stores a copy of the same software load in the memory. The processor of each card runs the hardware abstraction layer of the copy of the software load stored on that card to link one of the software applications appropriate for that card to at least one of the device drivers for controlling the at least one hardware device.

The invention in another aspect features a computer program product for use with a network element including a plurality of network cards. The computer program product comprises a computer useable medium having embodied therein program code comprising program code for installing a copy of a software load onto each card of a plurality of cards in a network element. Each copy of the software load includes a plurality of software applications. Each software application, when executed, provides a functionality of a different type of card that can be installed in the network element. The computer program product also includes program code on each card for controlling at least one hardware device on that card, for determining a type of that card, and for linking one of the software applications on that card to the program code for controlling at least one hardware device based on the type of card as determined by the program code for determining a card type.

In yet another aspect, the invention features a method for installing and configuring software on a network element in an optical communications network. A software load is installed onto a card of a network element. The software load includes a plurality of software applications. Each software application, when executed, provides a functionality of a different type of card that can be installed in the network element. Upon staring execution of the software load, an appropriate one of the software applications to be executed by the card is dynamically selected based on a type of the card.

BRIEF DESCRIPTION OF THE DRAWINGS

The above and further advantages of this invention may be better understood by referring to the following description in conjunction with the accompanying drawings, in which like numerals indicate like structural elements and feature in various figures. The drawings are not necessarily to scale, emphasis instead being placed upon illustrating the principles of the invention.

DETAILED DESCRIPTION

The invention features a system and method of installing and configuring software for each card of a network element. In brief overview, a software load refers to a set of software that provides the functionality of a given card when installed and configured on that card. Software is considered installed on a card when the software resides in local memory of that card and considered configured when settings or parameters of the software are changed or established, to define thereby certain functionality of the software.

The set of software in a software load includes application software, device drivers, and a configurable hardware abstraction layer (HAL). This software includes a superset of all application software for each type of card that may be installed in a network element. For example, different network elements can be constructed with different types of cards. One network element may have only OC-48 cards. The software load installed on this network element includes not only application software for OC-48 cards, but also application software for cards that are not part of the network element, such as DS1 electrical port cards. Also included in the software load is a superset of all device drivers for each type of hardware that can be implemented on a particular type of card. For example, the software load has a device driver for a Virtual Tributary Unit (VTU) device for supporting Virtual Tributary (VT) traffic, although an OC-N card upon which the software load is installed may not have a VTU device. Accordingly, the software load of the invention is also referred to as a common software load because the same software load (i.e., set of software) is installed on different types of network elements and on different types of cards in these network elements.

Logically, the configurable HAL is interposed between the application software and the device drivers in the common software load. To configure the common software load for use by a particular card, an identifier is read from the card. The HAL uses this identifier to select and link the application software and each device driver appropriate for the particular card. In one embodiment, the linking is achieved by a HAL profile that maps calls (i.e., function or procedure calls) from the appropriate application software to the device drivers implementing the operations contained in the function calls.

With the use of a configurable HAL, an installer updating or originally configuring the cards in a plurality of network elements can accommodate all of the cards with the transmission of one software load to each network element. Instead of centrally tracking and organizing card-specific software loads, the common software load, in combination with the HAL, manages the installation and upgrading process on the local card level.

Figure 1:
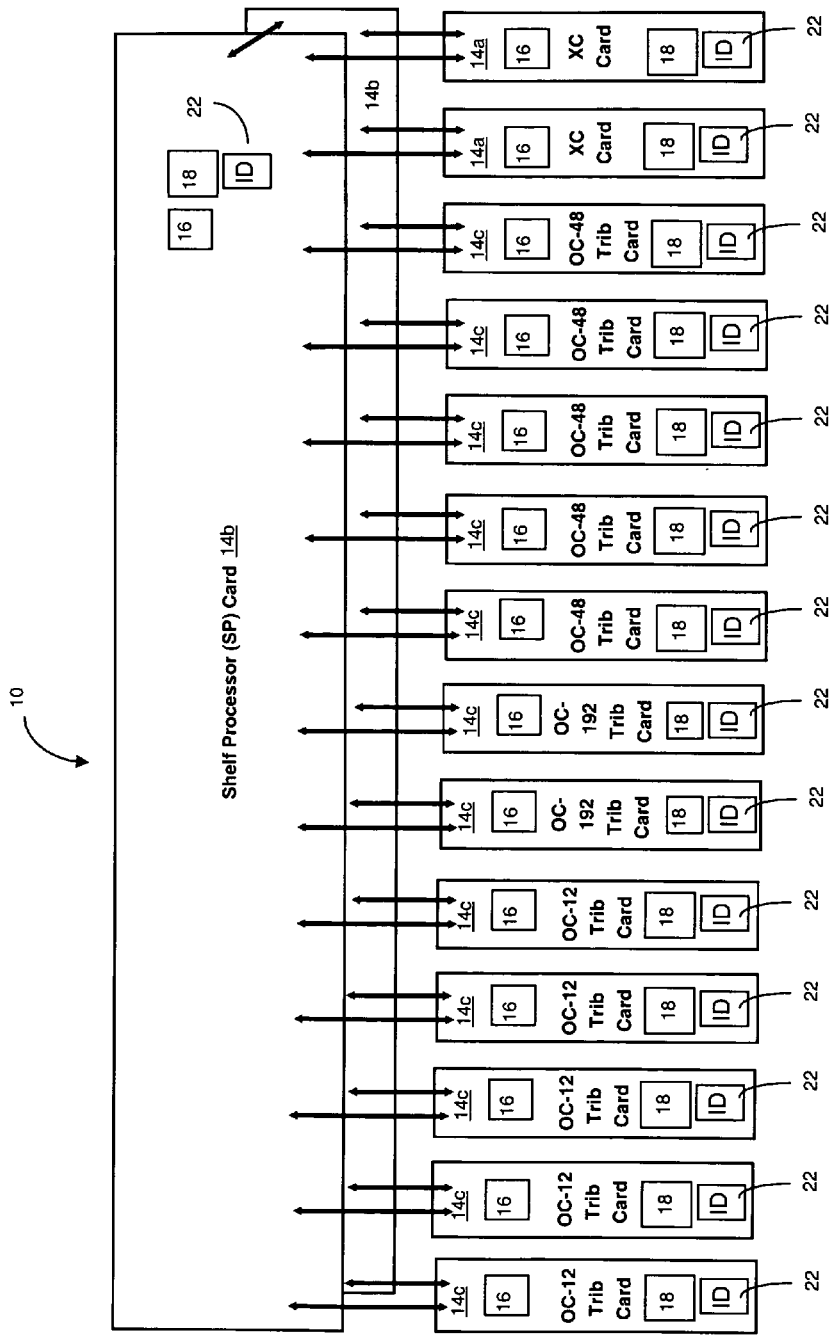
FIG. 1 is a block diagram of an embodiment of an optical network element constructed in accordance with the principles of the invention.

FIG. 1 shows an embodiment of a network element 10, i.e., a processor-based computing system configured to handle network traffic, constructed in accordance with the invention. The network element 10 comprises a plurality of cards (generally 14) of different types including redundant cross connect (XC) cards 14a, redundant shelf processor (SP) cards 14b, and port cards 14c. Different types of port cards 14c, for handling different signal formats and different signal rates, can be used to practice the invention. For example, signal formats that can be supported include, but are not limited to, DS1, DS3, E1, E3, Ethernet, OC-3, OC-12, OC-48, and OC-192 (also referred to as high-speed tributary cards). Port cards supporting electrical signals (e.g., DS1, DS3) are generally referred to as copper port cards; those supporting optical signals as optical port cards. For the sake of illustrating the invention, the exemplary network element 10 shown in FIG. 1 includes port cards 14c of the types OC-12, OC-48, and OC-192.

Each card 14 in the network element 10 includes a computer memory 18 that is used to store the common software load of the invention. Each card 14 also includes an identifier (generally 22). The identifier 22 of each card 14 indicates the type of the card 14 (i.e., OC-12, OC-192, SP, etc.). The card type determines the hardware devices 16 on that card 14 for which a device driver is required. In one embodiment, the identifier 22 is based on a product equipment code (PEC) associated with the card 14. The PEC is an alphanumeric text string that is used by customers to place purchase orders for the cards 14.

Figure 2:
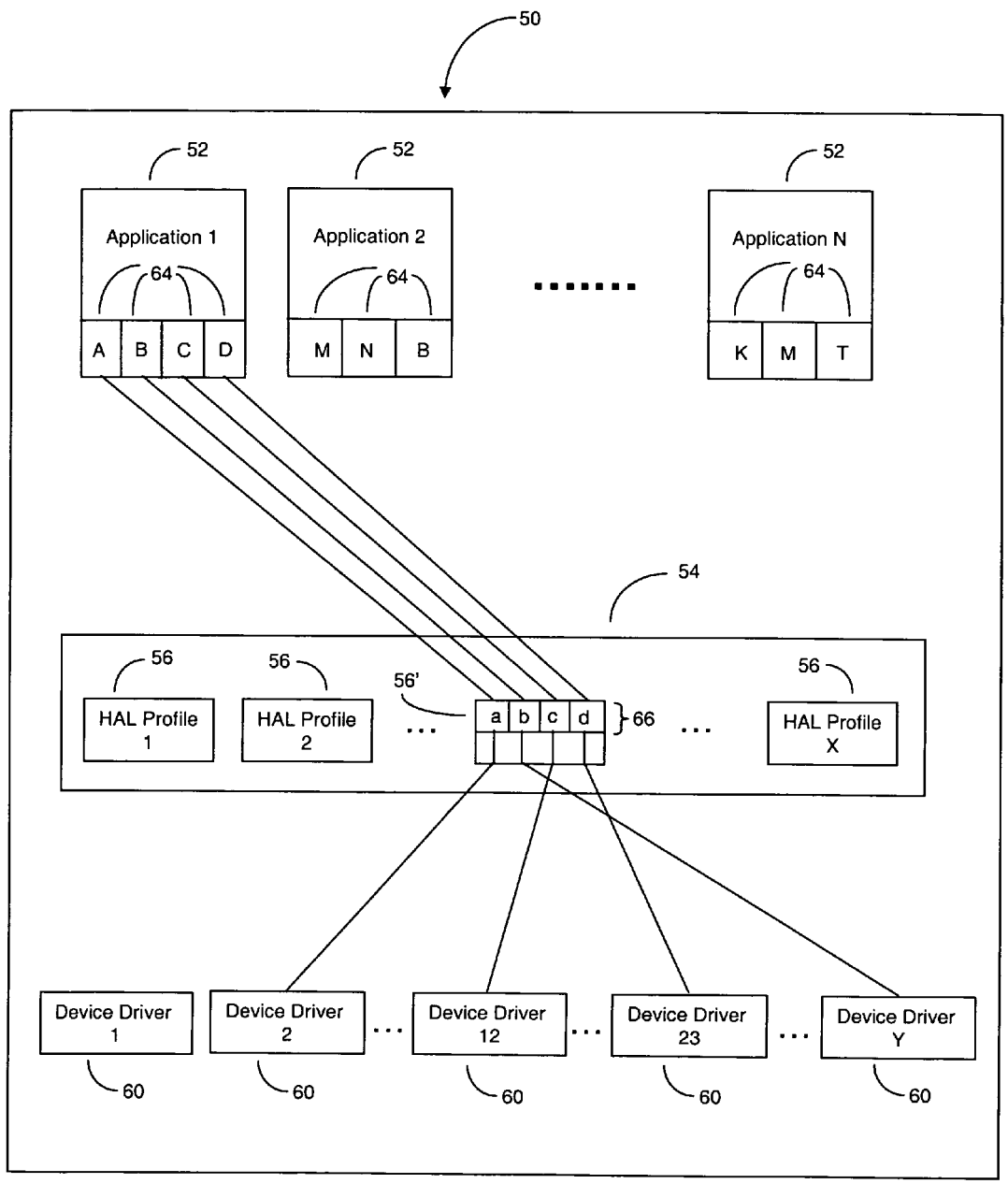
FIG. 2 is a block diagram of an embodiment of a software load of the invention.

FIG. 2 shows, in more detail, one embodiment of a common software load 50 according to the principles of the invention. This same software load 50 can be distributed to each card 14 in the network element 10 of FIG. 1. In an alternative embodiment, XC cards 14a receive a different software load than the common software load 50 received by each of the port cards 14c. The common software load 50 includes a set of applications 52, a HAL 54 having a set of HAL profiles 56, and a set of device drivers 60. The set of applications 52 includes one or more applications for each type of card that may be included in the network element 10. (A particular card can have more than one application.) Each application 52 implementes the functionality of the card for which that application 52 is designed. Each application 52 includes procedures or function calls 64 for using the hardware devices 16 on the card. The function calls 64 are handled by one or more of the device drivers 60. Each device driver 60 controls the functionality of the hardware device 16 with which that device driver 60 is coupled.

The set of applications 52 is a superset of applications; that is, the software load 50 includes more applications 52 than are necessary for the operation of any one particular card 14. For example, for the network element 10 of FIG. 1, the common software load 50 includes applications 52 not only for the OC-12, OC-48, OC-192, XC and SP cards, but also for cards not included in the network element 10, such as OC-3, DWDM, and DS1 cards.

In one embodiment, the set of device drivers 60 of the software load 50 includes the software necessary to operate the various hardware devices that may be included in each possible card in the network element 10. Such a device driver set may include, but is not limited to, TSOT, VTU, OOPs, GSB, and SETS device driver software. As a superset, not all device drivers in the set may be necessary to the operation of a given card. For example, any card not supporting VT traffic does not need the VTU driver, although the VTU drive is present in the software load 50.

In one embodiment, the common software load does not include all software applications or all device drivers. For example, a particular software application or a particular device driver may already be present on the cards (i.e., having been factory installed). If some or all of the software in the common software load duplicates previously installed or factory-installed software, the card can be configured to select one of the two software versions automatically, for example, based on the newer (i.e., higher numbered) version.

The HAL 54 provides an interface between the applications 52 and the device drivers 60. Each HAL profile 56 of the HAL 54 is a catalog of services provided by the device drivers 60. (The software load 50 contains a plurality of such catalogs). The appropriate catalog is selected and a "late binding" is applied such that the appropriate application is linked to the appropriate device driver service. More specially, an application program interface 66 (i.e., catalog of services) includes software or code for handling corresponding function calls 64 of the associated application 52. For example, in FIG. 2, the HAL profile 56' has an application program interface 66 with distinct routines labeled a, b, c, d, for handling corresponding function calls 64, labeled A, B, C, D, from the Application No. 1. These routines, a, b, c, d, in effect, bind each function call 64 to the appropriate device driver service. Accordingly, each HAL profile 56 operates to map or link the function calls 64 of an application 52 with the appropriate device driver service. Thus, when the application 52 executes a function call 64, the appropriate device driver service responds.

Which HAL profile 56 becomes active depends upon the type of card 14. The HAL 54 is dynamically configurable in that the determination of the card type occurs at runtime, when the software load 50 starts to execute. Before this determination, the HAL 54 can support any card type; after the determination, the HAL 54 is set to support a specific hardware configuration. The HAL also determines which application is selected (e.g., based on the card identifier presented by the HAL and read by the boot code).

Figure 3:
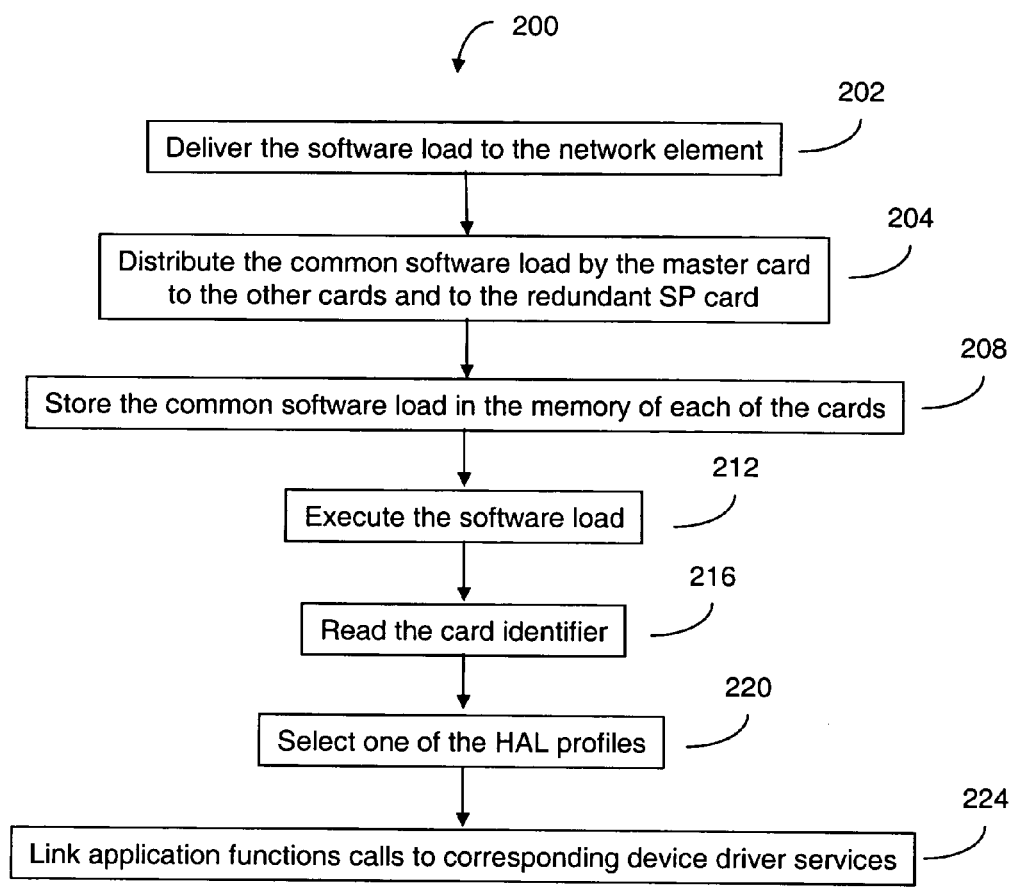
FIG. 3 is a flow diagram of a process for installing and configuring software on each of the cards of the network element in accordance with the invention.

FIG. 3 shows an embodiment for a process 200 for installing and configuring the common software load 50 onto the cards 14 in the network element 10. The process 200 includes delivering (step 202) the software load 50 to the network element 10. In one embodiment, the common software load 50 is transmitted to one of the SP cards 14b, referred to as the master SP card 14b, over a network and stored in local memory of the master SP card 14b. The master SP card 14b then distributes (step 204) the common software load 50 to each of the other cards 14a, 14c and to the redundant SP card 14b. In an alternative embodiment, the master SP card 14b distributes a modified software load. For example, the master SP card 14b can transmit to the port cards a modified software load that does not include the applications and device drivers that are not used by the cards 14a, 14c.

The process 200 of installing and configuring the common software load also includes storing (step 208) the common software load in the memory of each of the cards 14. One or more of the cards 14 may already have factory-installed software on that card 14 stored in local memory (e.g., FLASH). The cards 14 can be configured to use the newer software version, whether the factory-installed software or the software load 50.

For each card, when the software load 50 starts executing (step 212) on that card, the software reads (step 216) the card identifier 22. Based on the identifier 22, one of the HAL profiles 56 is selected (step 220) for execution. In general, different cards types cause different HAL profiles 56 to be selected. In some instances, different card types can have the same hardware configuration and thus use the same HAL profile 56. These different card types can thus have different identifiers that cause selection of the same HAL profile 56 (i.e., there need not be a unique association between identifiers 22 and HAL profiles 56). Selection of the HAL profile 56 determines which application 52 and which set of device drivers 60 of the software load 50 are to be executed on the card 14 and dynamically establishes (step 224) links between the function calls 64 of that application 52 and those device drivers 60.

The invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

While the invention has been shown and descried with reference to specific preferred embodiments, it should be understood by those skilled in the art that various changes in form and detail may be made therein without departing from the spirit and scope of the invention as defined by the following claims.

What is claimed is:

1. In an optical network having a network element with a plurality of cards of different types, a method for installing and configuring software applications and device drivers in the network element, the method comprising:

delivering a software load to a first card of the plurality of cards in the network element;

distributing, by the first card, a copy of the software load to at least two other cards of the plurality of cards in the network element, each distributed copy of the software load including a plurality of software applications for different types of cards, a hardware abstraction layer, and a plurality of device drivers for controlling different types of hardware devices; and executing, by each of the at least two other cards in the network element, the copy of the software load distributed to that card, wherein the executing of the copy of the software load by each of the at least two other cards includes:

determining, by the hardware abstraction layer of each card, a type of that card; and linking, by the hardware abstraction layer of each card, one of the software applications of the software load to at least one of the device drivers based on the type of that card.

2. The method according to claim 1, wherein the plurality of software applications of the software load includes a software application for each possible type of card that may be installed in the network element.

3. The method according to claim 1, wherein the plurality of device drivers of the software load includes a device driver for each possible type of hardware device of each possible type of card that may be installed in the network element.

4. The method according to claim 1, further comprising:

determining by one of the cards that the software load contains software that is a duplicate of software previously installed on that card; and selecting by that card the software of the software load if the software of the software load is a more recent version than the software previously installed on that card.

5. The method according to claim 1, wherein one card of the plurality of cards is an Ethernet electrical port card.

6. The method according to claim 1, wherein one card of the plurality of cards is an OC-48 optical port card.

7. The method according to claim 1, wherein one card of the plurality of cards is a shelf processor card.

8. The method of claim 1, further comprising modifying, by the first card, the copy of the software load before distributing the copy of the software load to the at least one other cards in the network element.

9. The method of claim 8, wherein the modifying, by the first card, of the copy of the software load includes removing at least one software application or at least one device driver from the copy of the software load.

10. The method of claim 8, wherein contents of the copy of the software load distributed to one of the at least two other cards in the network element are different from contents of the copy of the software load distributed to another of the at least two other cards in the network element.

11. The method of claim 1, wherein the copy of the software load distributed to one of the at least two other cards in the network element is the same as the copy of the software load distributed to another of the at least two other cards in the network element.

12. A network element, comprising a plurality of cards of different types, each card having at least one hardware device, a processor, and memory, a first card of the plurality of cards receiving a software load including a plurality of software applications for operating a plurality of different card types, a hardware abstraction layer, and a plurality of device drivers for controlling a plurality of different types of hardware devices, the first card distributing a copy of the software load to at least two other cards of the plurality of cards, each of the at least two other cards of the plurality of cards storing the copy of the software load in the memory of that card, the processor of each of the at least two other cards running the hardware abstraction layer of the copy of the software load stored on that card to link one of the software applications appropriate for that card to at least one of the device drivers for controlling the at least one hardware device of that card.

13. The network element according to claim 12, wherein the memory of each card stores an identifier that indicates a type of that card and the hardware abstraction layer of that card links the appropriate one of the software applications to at least one of the device drivers based on the type of that card.

14. The network element according to claim 12, wherein the plurality of software applications stored on each card includes a software application for each possible type of card that may be installed in the network element.

15. The network element according to claim 12, wherein the plurality of device drivers stored on each card includes a device driver for each possible type of hardware device of each possible type of card that may be installed in the network element.

16. A computer program product for use with a network element including a plurality of network cards of different types, the computer program product comprising a computer useable medium having embodied therein program code comprising:
    program code for receiving a software load at a first card of the plurality of cards in the network element;
    program code for distributing by the first card a copy of a software load to at least two other cards of the plurality of cards in the network element, each copy of the software load including a plurality of software applications, a hardware abstraction layer, and a plurality of device drivers for controlling different types of hardware devices, each software application when executed providing a functionality of a different type of card that can be installed in the network element;
    program cod on each card for controlling at least one hardware device on that card; and
    program code on each of the at least two other cards for executing the copy of the software load distributed to that card, wherein the program code for executing of the copy of the software load distributed to that card includes:
    program code for determining, by the hardware abstraction layer of each card, a type of that card; and
    program code for linking, by the hardware abstraction layer of each card, one of the software applications on that card to the program code for controlling at least one hardware device based on the type of card as determined by the program code for determining a card type.

17. The computer program product according to claim 16, further comprising program code for storing an identifier on each card that indicates the type of that card.

18. The computer program product according to claim 16, wherein the plurality of software applications stored on each card includes a software application for each possible type of card that may be installed in the network element.

19. The computer program product according to claim 16, wherein the program code on each card for controlling at least one hardware device includes program code for each possible type of hardware device of each possible type of card that may be installed in the network element.

* * * * *

UNITED STATES PATENT AND TRADEMARK OFFICE
CERTIFICATE OF CORRECTION

| | | |
|---|---|---|
| PATENT NO. | : 7,487,500 B1 | Page 1 of 1 |
| APPLICATION NO. | : 10/962043 | |
| DATED | : February 3, 2009 | |
| INVENTOR(S) | : David McCracken, Paul Crossey and Helen Cassidy | |

It is certified that error appears in the above-identified patent and that said Letters Patent is hereby corrected as shown below:

Col. 7, Line 3, "one" should be changed to --two--

Signed and Sealed this

Twenty-first Day of April, 2009

JOHN DOLL
*Acting Director of the United States Patent and Trademark Office*